United States Patent [19]
Morjaria et al.

[11] Patent Number: 5,845,272
[45] Date of Patent: Dec. 1, 1998

[54] SYSTEM AND METHOD FOR ISOLATING FAILURES IN A LOCOMOTIVE

[75] Inventors: Mahesh Amritlal Morjaria, Niskayuna; Steven Hector Azzaro, Schenectady, both of N.Y.; James Arthur Bush, Erie, Pa.; James Weston Nash, North East, Pa.; Myron Lee Smith, Fairview, Pa.; William David Smith, Schenectady, N.Y.

[73] Assignee: General Electric Company, Schenectady, N.Y.

[21] Appl. No.: 753,583

[22] Filed: Nov. 29, 1996

[51] Int. Cl.⁶ .................................................. G06F 15/18
[52] U.S. Cl. .............................................. 706/50; 706/45
[58] Field of Search ........................ 395/50–54, 60–61, 395/183.02; 364/550, 148; 706/50, 45

[56] References Cited

U.S. PATENT DOCUMENTS

| | | | |
|---|---|---|---|
| 4,517,468 | 5/1985 | Kemper et al. | 290/52 |
| 4,644,479 | 2/1987 | Kemper et al. | 364/550 |
| 4,964,125 | 10/1990 | Kim | 395/183.02 |
| 5,018,075 | 5/1991 | Ryan et al. | 706/46 |
| 5,099,436 | 3/1992 | McCown et al. | 702/82 |
| 5,123,017 | 6/1992 | Simpkins et al. | 395/183.02 |
| 5,132,920 | 7/1992 | Bellows et al. | 364/551.01 |
| 5,133,046 | 7/1992 | Kaplan | 395/61 |
| 5,400,018 | 3/1995 | Scholl et al. | 340/825.54 |
| 5,431,832 | 7/1995 | Nakajima et al. | 364/148.05 |
| 5,445,347 | 8/1995 | Ng | 246/169 R |
| 5,448,722 | 9/1995 | Lynne et al. | 395/53 |
| 5,493,729 | 2/1996 | Nigawara et al. | 395/61 |

OTHER PUBLICATIONS

General Electric Company Publication Entitled "On–Board Diagnostics System: Most Likely Problems Isolation Mechanism", AC6000 Locomotive, By Jay Khan & Steve Azzaro, May 24, 1995.

Penalva et al, "A supervision support system for industrial processes," IEEE Expert, vol. 8, iss. 5, pp. 57–65 Oct. 1993.

Green et al, "An adaptable expert aid to fault diagnosis in satellite communication networks," International Conference on Information–Decision–Action Systems in Complex Organizations, pp. 153–157, Apr. 1992.

Lee, "Sensor value validation based on systematic exploration of the sensor redundancy for fault diagnosis KBS," IEEE Transactions on Systems, Man and Cybernetics, vol. 24, iss. 4, pp. 594–605, Apr. 1994.

Raaphorst et al, "Automated fault–tree generation of operational fault–diagnosis," IEE Conference on Electric Railways in United Europe, pp. 173–177, Mar. 1995.

*Primary Examiner*—Tariq R. Hafiz
*Assistant Examiner*—Sanjiv Shah
*Attorney, Agent, or Firm*—David C. Goldman; Marvin Snyder

[57] ABSTRACT

The present invention discloses a system and method for isolating failures in a locomotive. In the present invention, the cause of failures occurring in the locomotive subsystems are determined quickly and efficiently, while minimizing the need for human interaction. However, the present invention can incorporate information provided by an operator to produce a more refined diagnosis. In the present invention, incidents are recorded in an incident log and mapped to indicators, which are sent to a fault isolator for diagnosis. The fault isolator uses a diagnostic knowledge base having diagnostic information between failures occurring in locomotive and observable symptoms happening therein. A diagnostic engine then processes the mapped indicators with the diagnostic information in the diagnostic knowledge base and produces a list of the most likely causes for any failures. The present invention then provides a course of action to correct the failures. The present invention can also be used to automatically isolate and diagnose failures occurring in process having a plurality of equipment.

32 Claims, 11 Drawing Sheets

SYSTEM AND METHOD FOR ISOLATING FAILURES IN A LOCOMOTIVE

BACKGROUND OF THE INVENTION

The present invention relates generally to locomotives and more particularly to a system and method for isolating and correcting failures in a locomotive.

A locomotive is a complex electromechanical system comprised of several complex sub-systems. Each of these sub-systems is built from components which over time will fail. When a component does fail, it is difficult to identify the failed component because the effects or problems that the failure has on the sub-system are often neither obvious in terms of their source nor unique. The ability to automatically diagnose problems that have occurred or will occur in the locomotive sub-systems has a positive impact on minimizing locomotive down-time.

Previous attempts to diagnose problems occurring in a locomotive have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive sub-systems to problems that may be causing the incidents. If the incident-problem scenario is simple, then this approach works fairly well. However, if the incident-problem scenario is complex, then it is very difficult to diagnose and correct any failures associated with the incidents.

Currently, computer-based systems are being used to automatically diagnose problems in a locomotive in order to overcome some of the disadvantages associated with completely relying on experienced personnel. Typically, a computer-based system utilizes a mapping between the observed symptoms of the failures and the equipment problems using techniques such as a table look up, a symptom-problem matrix, and production rules. These techniques work well for simplified systems having simple mappings between symptoms and problems. However, complex equipment and process diagnostics seldom have simple correspondences between the symptoms and the problems. In addition, not all symptoms are necessarily present if a problem has occurred, thus making other approaches more cumbersome.

Since the above-mentioned approaches either take a considerable amount of time before failures are diagnosed, or provide less than reliable results, or are unable to work well in complex systems, there is a need to be able to quickly and efficiently determine the cause of any failures occurring in the locomotive sub-systems, while minimizing the need for human interaction.

SUMMARY OF THE INVENTION

Accordingly, it is a primary objective of the present invention to provide a system and method that can quickly and efficiently determine the cause of failures occurring in the locomotive sub-systems, while minimizing the need for human interaction.

Another objective of the present invention is to provide a system and method that does not require operator interaction, however, that can incorporate information provided by an operator to produce a more accurate diagnosis.

Still another objective of the present invention is to provide a system and method that is able to determine a list of the most likely causes for any locomotive failures, as well as provide a list of corrective actions to take to correct the failures.

Yet another objective of the present invention is to provide a system and method that can quickly and efficiently determine the cause of failures occurring in complex equipment and processes.

Thus, in accordance with one embodiment of the present invention, there is provided a system and method for isolating failures in a locomotive having a plurality of sub-systems. In the present invention, a supplying means supplies incident information occurring in each of the plurality of sub-systems during operation of the locomotive. A mapping means maps some of the incidents to indicators. Each indicator is representative of an observable symptom detected in a sub-system. A fault isolator coupled to the mapping means determines causes for any failures associated with the incidents. The fault isolator comprises a diagnostic knowledge base having diagnostic information about failures occurring in each of the plurality of sub-systems and the indicators. Also, the fault isolator comprises a diagnostic engine for processing the mapped indicators with the diagnostic information in the diagnostic knowledge base. A providing means provides a course of action to be performed for correcting the failures.

In accordance with a second embodiment of the present invention, there is provided a system and method for automatically isolating failures occurring in a process having a plurality of equipment. In this embodiment, the present invention comprises a plurality of sensors located about the process for measuring physical phenomena associated with the plurality of equipment. A mapping means maps some of the sensor measurements to indicators. Each indicator is representative of an observable symptom detected in a piece of equipment. A fault isolator coupled to the mapping means determines causes for any failures associated with the equipment. The fault isolator comprises a diagnostic knowledge base having diagnostic information about failures occurring in each of the plurality of equipment and the indicators. The diagnostic information comprises a plurality of causal networks each having a plurality of nodes for each of the plurality of equipment. Each causal network has a cause and effect relationship between some of the plurality of nodes, wherein some of the nodes represent root causes associated with failures in each of the plurality of equipment and some of the nodes represent observable manifestations of the failures. The fault isolator also comprises a diagnostic engine for processing the mapped indicators with the diagnostic information in the diagnostic knowledge base. A providing means then provides a course of action to be performed for correcting the failures.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
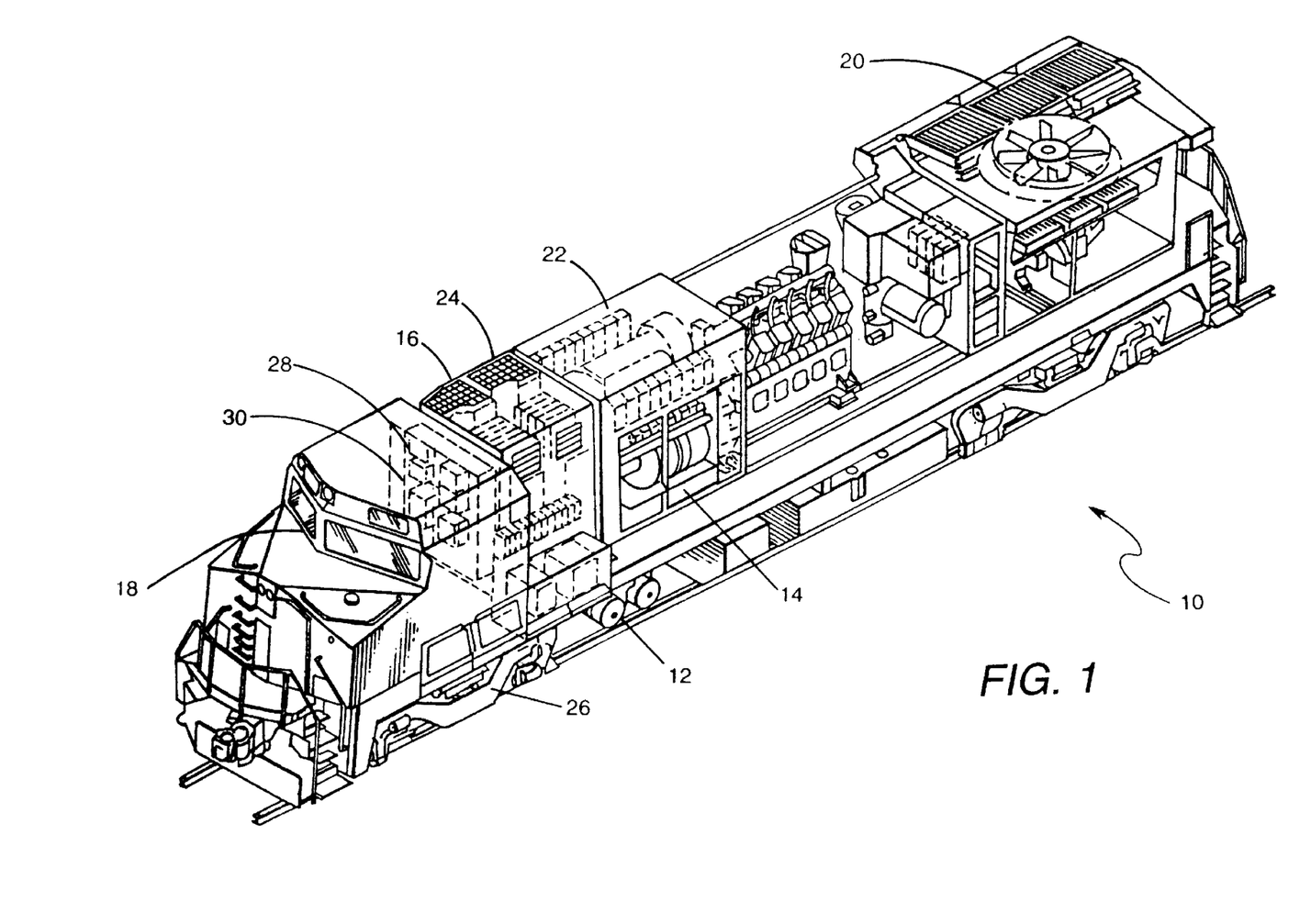
FIG. 1 shows a schematic of a locomotive.

FIG. 1 shows a schematic of a locomotive 10. The locomotive may be either an AC or DC locomotive. The locomotive 10 is comprised of several complex sub-systems, each performing separate functions. Some of the sub-systems and their functions are listed below. Note that the locomotive 10 is comprised of many other sub-systems and that the present invention is not limited to the sub-systems disclosed herein.

An air and air brake sub-system 12 provides compressed air to the locomotive, which uses the compressed air to actuate the air brakes on the locomotive and cars behind it.

An auxiliary alternator sub-system 14 powers all auxiliary equipment. In particular, it supplies power directly to an auxiliary blower motor and an exhauster motor. Other equipment in the locomotive is powered through a cycle skipper.

A battery and cranker sub-system 16 provides voltage to maintain the battery at an optimum charge and supplies power for operation of a DC bus and a HVAC system.

An intra-consist communications sub-system collects, distributes, and displays consist data across all locomotives in the consist.

A cab signal sub-system 18 links the wayside to the train control system. In particular, the system 18 receives coded signals from the rails through track receivers located on the front and rear of the locomotive. The information received is used to inform the locomotive operator of the speed limit and operating mode.

A distributed power control sub-system provides remote control capability of multiple locomotive consists anywhere in the train. It also provides for control of tractive power in motoring and braking, as well as air brake control.

An engine cooling sub-system 20 provides the means by which the engine and other components reject heat to the cooling water. In addition, it minimizes engine thermal cycling by maintaining an optimal engine temperature throughout the load range and prevents overheating in tunnels.

An end of train sub-system provides communication between the locomotive cab and last car via a radio link for the purpose of emergency braking.

An equipment ventilation sub-system 22 provides the means to cool the locomotive equipment.

An event recorder sub-system records FRA required data and limited defined data for operator evaluation and accident investigation. It can store up to 72 hours of data.

A fuel monitoring sub-system provides means for monitoring the fuel level and relaying the information to the crew.

A global positioning sub-system uses NAVSTAR satellite signals to provide accurate position, velocity and altitude measurements to the control system. In addition, it also provides a precise UTC reference to the control system.

A mobile communications package sub-system provides the main data link between the locomotive and the wayside via a 900 MHz radio.

A propulsion sub-system 24 provides the means to move the locomotive. It also includes the traction motors and dynamic braking capability. In particular, the propulsion sub-system 24 receives power from the traction alternator and through the traction motors, converts it to locomotive movement.

A shared resources sub-system includes the I/O communication devices, which are shared by multiple sub-systems.

A traction alternator sub-system 26 converts mechanical power to electrical power which is then provided to the propulsion system.

A vehicle control system sub-system reads operator inputs and determines the locomotive operating modes.

The above-mentioned sub-systems are monitored by a locomotive control system 28 located in the locomotive. The locomotive control system 28 keeps track of any incidents occurring in the sub-systems with an incident log. An on-board diagnostics sub-system 30 receives the incident information supplied from the control system and maps some of the recorded incidents to indicators. The indicators are representative of observable symptoms detected in the sub-systems. The on-board diagnostic sub-system 30 then determines a list of the most likely causes for any locomotive failures, as well as provides a list of corrective actions to take to correct the failures. In addition, the on-board diagnostics system can request that certain manual indicators located about the sub-system be checked, and based on the status of the manual indicators, refines the diagnosis to provide better results.

Figure 2:
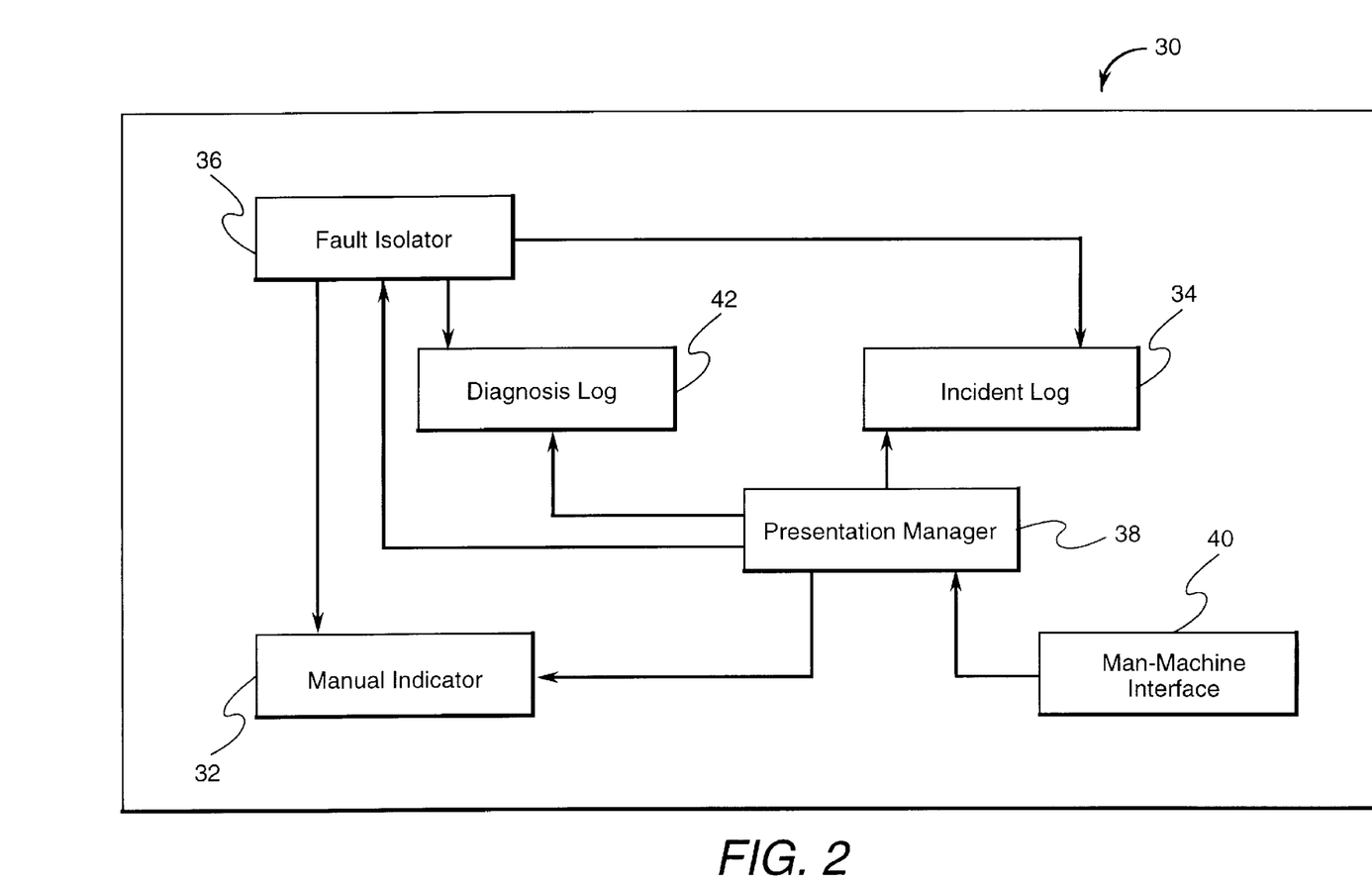
FIG. 2 is a block diagram of an on-board diagnostics sub-system according to the present invention.

A block diagram of the on-board diagnostics sub-system 30 is shown in FIG. 2. The on-board diagnostics sub-system 30 is a computer-based system that comprises a plurality of manual indicators 32 located about the locomotive for detecting faults in each of the sub-systems. An incident log 34 records incidents occurring in each of the sub-systems during the operation of the locomotive. Some of the incidents are mapped to indicators in a fault isolator 36. Each indicator is representative of an observable symptom in a sub-system. The fault isolator 36 determines causes for any failures associated with the incidents from the mapped indicators, after being prompted by a presentation manager 38, through an operator and a man-machine interface 40. From the causes, the fault isolator 36 provides a diagnosis for correcting the failures. The diagnosis is then sent to a diagnosis log 42, which can be accessed by the man-machine interface 40 through the presentation manager 38. The diagnosis in the diagnosis log 42 provides a list of the most likely causes for any locomotive failures, as well as provides a list of corrective actions to take to correct the failures. In order to produce a more accurate diagnosis, the fault isolator 36 can request that the operator check some manual indicators 32 located throughout the locomotive sub-systems. The fault isolator will then refine the previous diagnosis and send the new diagnosis to the diagnosis log 42.

Figure 3:
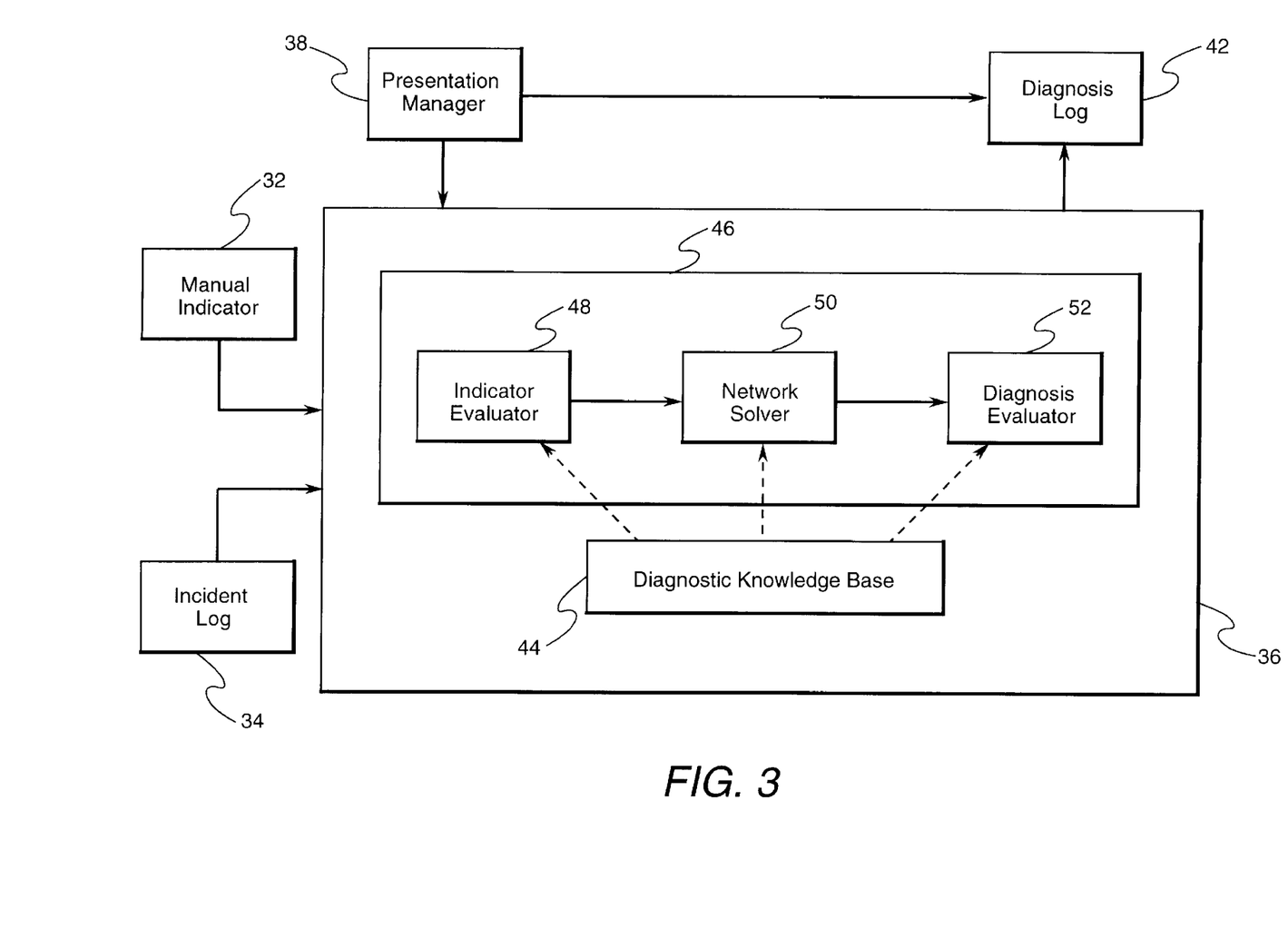
FIG. 3 is a block diagram of a fault isolator used in the on-board diagnostics sub-system according to the present invention.

A more detailed view of the fault isolator 36 is provided in the block diagram of FIG. 3. The fault isolator 36 comprises a diagnostic knowledge base 44, which has diagnostic information about failures occurring in each of the sub-systems and observable symptoms that can happen in each of the sub-systems. The fault isolator 36 also comprises a diagnostic engine 46 that processes the mapped indicators with the diagnostic information in the diagnostic knowledge base 44. The diagnostic information in the diagnostic knowledge base comprises a plurality of causal networks, each having a plurality of nodes for each of the locomotive sub-systems. Each causal network has a cause and effect relationship between some of the plurality of nodes, wherein some of the nodes represent root causes associated with failures in each of the sub-systems and some of the nodes represent observable manifestations of the failures. Each of the root causes in the causal networks has a prior probability indicating the likelihood of a failure in the absence of any additional knowledge provided from either the manual indicators 32 or the incident log 34. Also, each of the nodes in the causal networks has conditional probability information representing the strength of the relationships of the node to its causes.

The diagnostic engine 46 comprises an indicator evaluator 48 for invoking the plurality of causal networks according to the mapped indicators and evaluating the mapped indicators with the probabilities in the invoked causal networks. The diagnostic engine 46 further comprises a network solver 50 for recalculating the probabilities of the invoked causal networks according to the status of the mapped indicators. The diagnostic engine 46 further comprises a diagnostic evaluator 52 for evaluating the recalculated probabilities in the invoked causal networks. In addition, the diagnostic evaluator provides a list of the most likely causes for any locomotive failures, as well as provides a list of corrective actions to take to correct the failures. Furthermore, the diagnostic evaluator 52 prompts an operator to examine manual indicators 32 that may further refine the diagnosis. The indicator evaluator then invokes the plurality of causal networks according to the status of the manually examined indicators. The network solver 50 then recalculates the probabilities in the invoked causal networks according to the status of the manually examined indicators. The diagnostic evaluator then evaluates the recalculated probabilities in the invoked causal networks and provides a new list to the diagnosis log 42 of the most likely causes which have resulted in the generalization of the incidents. In addition, the diagnosis evaluator provides a course of action to be performed for correcting the failures. In particular, some of the causes associated with the failures are mapped to a set of specific, action-oriented instructions to be performed. These instructions, obtained from the list of likely causes, are associated with some of the nodes in the network and are called action nodes. Several of these causes may require the same repair action. Also, instructions are given only for causes exceeding a pre-specified probability threshold.

Figure 4:
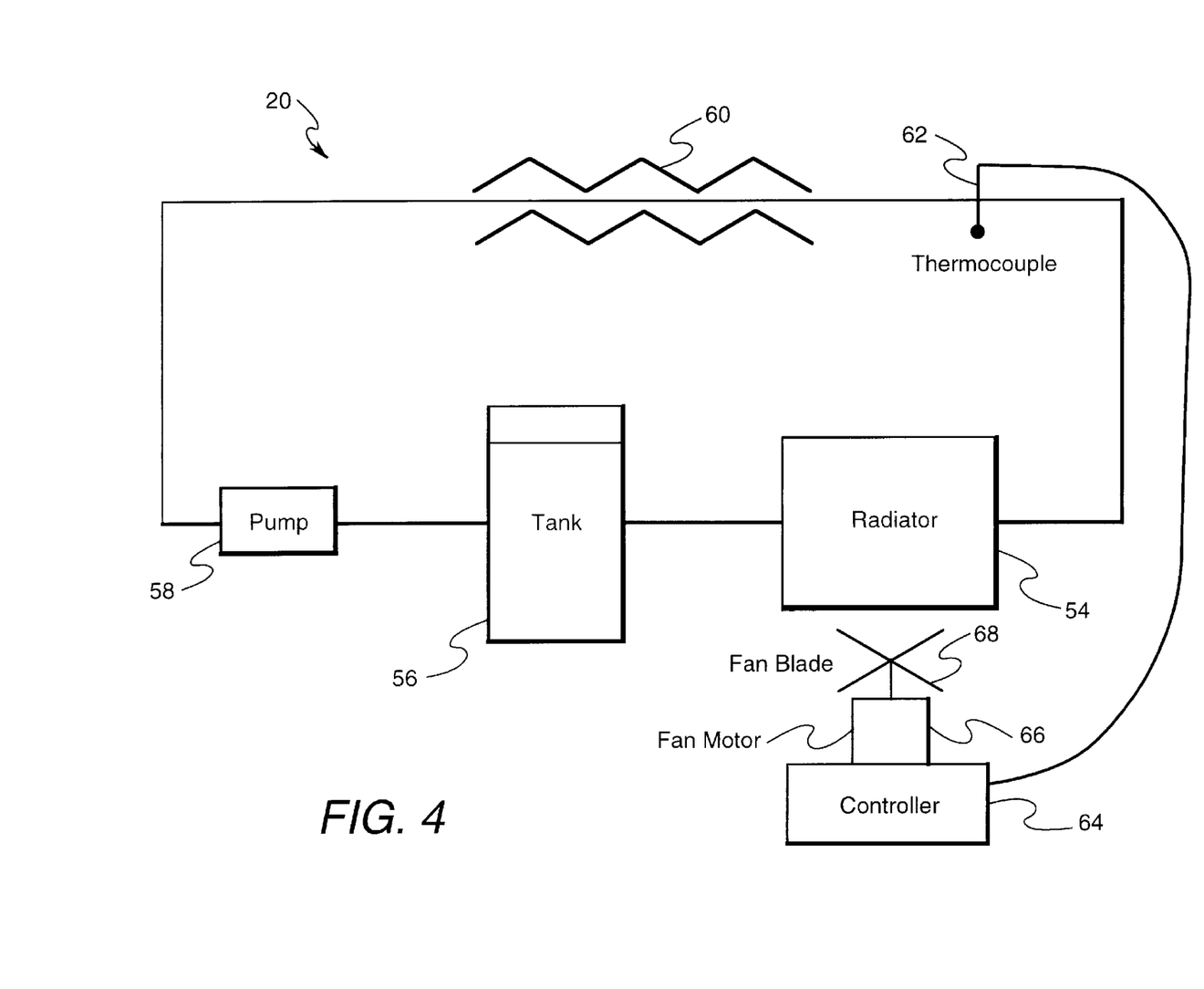
FIG. 4 is a schematic diagram of a model locomotive engine cooling sub-system.

As mentioned above, each causal network in the diagnostic knowledge base 44 has a representation of the cause and effect relationships between failures and observable symptoms for each of the locomotive sub-systems. Thus, in order to develop the diagnostic knowledge base 44, there has to be an understanding of how each component in a sub-system fails and what are the observable symptoms of each failure. An example of a model of one of the locomotive sub-systems is provided in FIG. 4, which shows a schematic of a model engine cooling system 20. The model engine cooling system 20 comprises a radiator 54 for maintaining an optimal engine temperature throughout a load range and preventing overheating. The radiator maintains the optimal engine temperature by providing a coolant pumped from a tank 56 by a pump 58 through a pipe 60. The temperature of the coolant is continuously monitored by a thermocouple 62, which is coupled to a controller 64. The controller 64 uses the temperature of the coolant to control the radiator 54 with a fan motor 66 and a fan blade 68. The possible failure modes that the engine cooling system 20 may be subject to are thermocouple failure, pipe leakage, pump failure, radiator plugs, radiator leaks, tank leaks, fan blade breakage, fan motor failure, and controller failure.

Figure 5A:
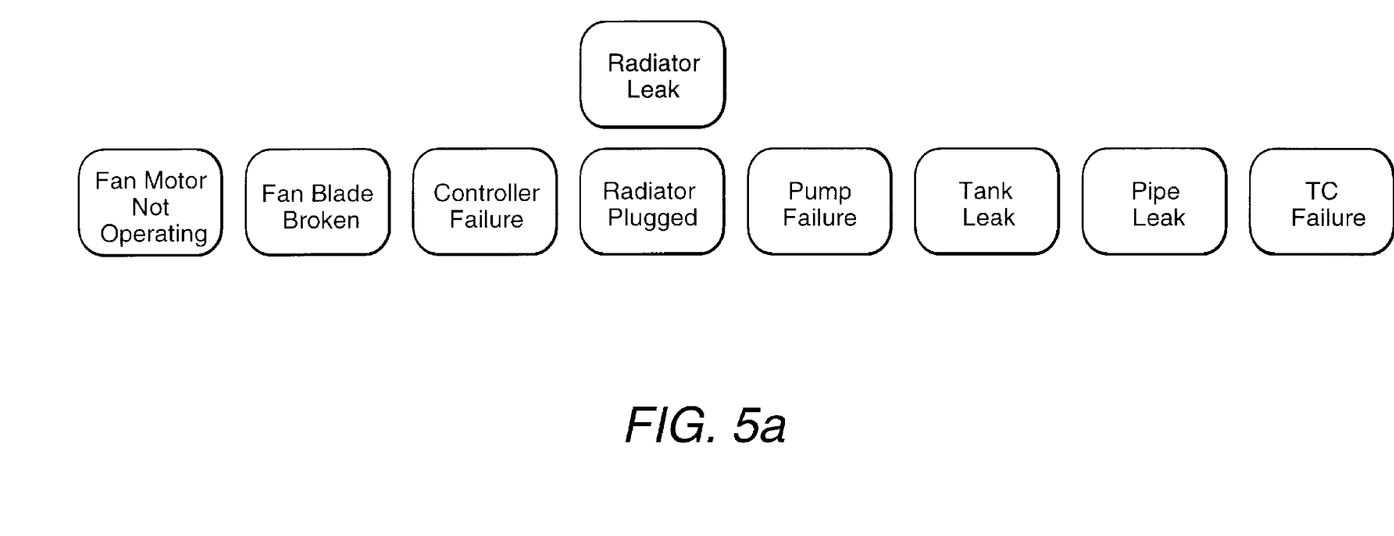
FIGS. 5a–5d show a causal network for the model locomotive engine cooling sub-system.

After all of the possible failure modes have been identified for the model engine cooling system 20, the causal network for the engine cooling system is developed. FIGS. 5a–5d show a causal network for the engine cooling system 20. FIG. 5a shows each of the identified failure modes for the engine cooling system. Each of the failure modes (i.e., thermocouple failure, pipe leakage, pump failure, radiator plugs, radiator leaks, tank leaks, fan blade breakage, fan motor failure, and controller failure) is designated as a problem node or a cause and is represented as a box with rounded corners. Each cause has some higher level effect on the engine cooling system and it is also possible that several causes may have the same effect. At some point, an effect manifests itself such that it can be measured or observed. When the state of a single observable symptom or the state of several observable symptoms is unique to a single cause, then it will be possible to unambiguously identify the problem.

Figure 5B:
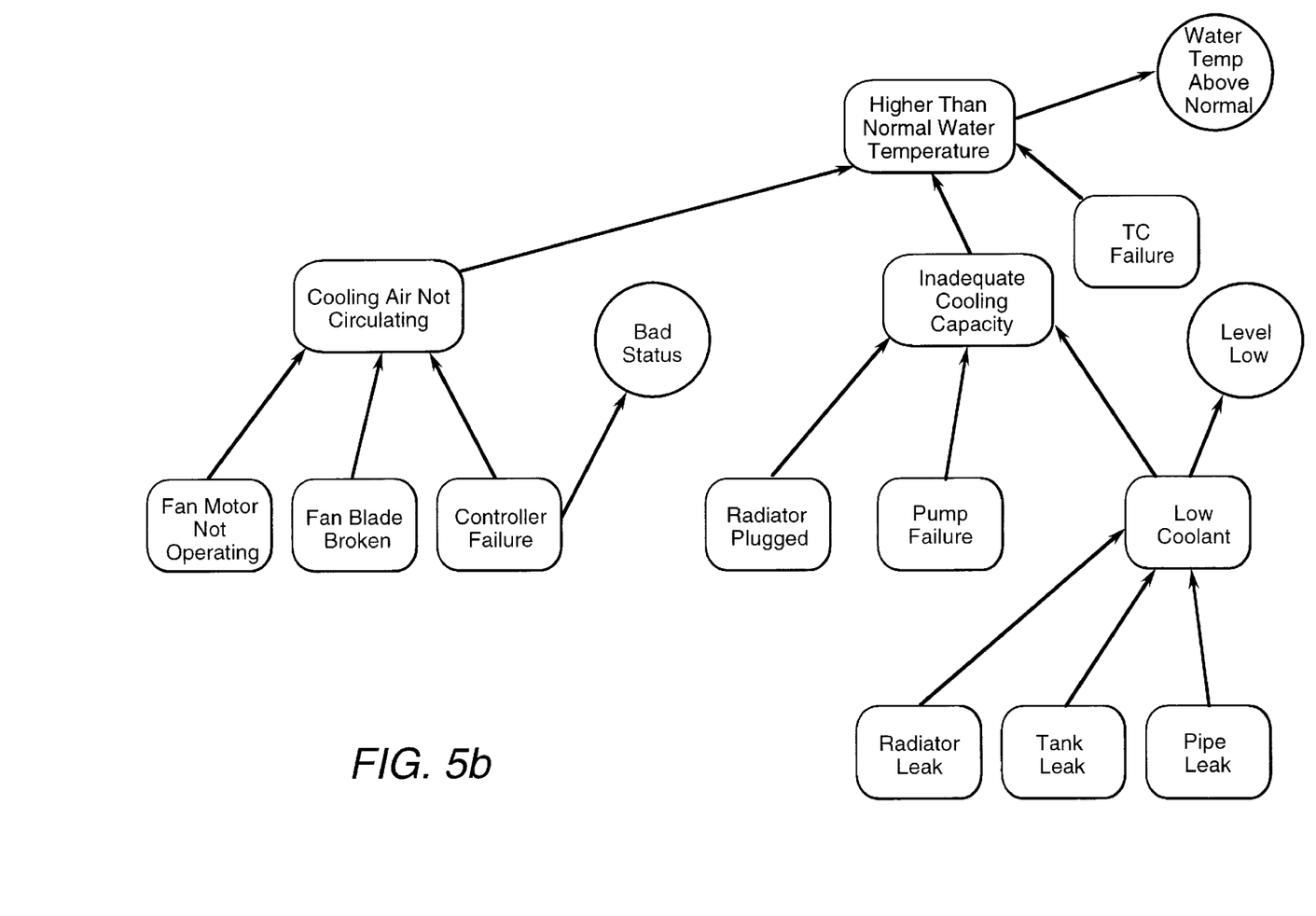

FIG. 5b shows the cause and effect relationships for each of the failure modes identified in FIG. 5a. The cause and effect relationship between each of the nodes is shown with an arrow pointing in the direction of the causality. In FIG. 5b, the failure modes of a radiator leak, a tank leak, and a pipe leak, are shown to have an effect that is each characterized with low coolant. The low coolant node is coupled to an indicator node, low level, that indicates whether the coolant is low. The indicator node is a node that is always an effect that represents the value of a measured or calculated parameter. It is represented by a circle. These nodes are used to represent evidence that is presented to the network. The low coolant node along with the radiator plugged and pump failure modes are shown to have an effect that is each characterized with an inadequate cooling capacity. Another level in FIG. 5b has the fan motor not operating, fan blade broken, and controller failure, as causes. Each of these failure modes has an effect that is characterized by the cooling air not circulating. In addition, the controller failure mode is coupled to an indicator node that checks if the controller has a bad status. At a higher level, the thermocouple failure mode along with the effects of cooling air not circulating and inadequate cooling capacity, have an effect on the engine cooling system that is characterized by higher than normal water temperature. This effect is coupled to an indicator that checks if the water temperature is above normal.

Figure 5C:
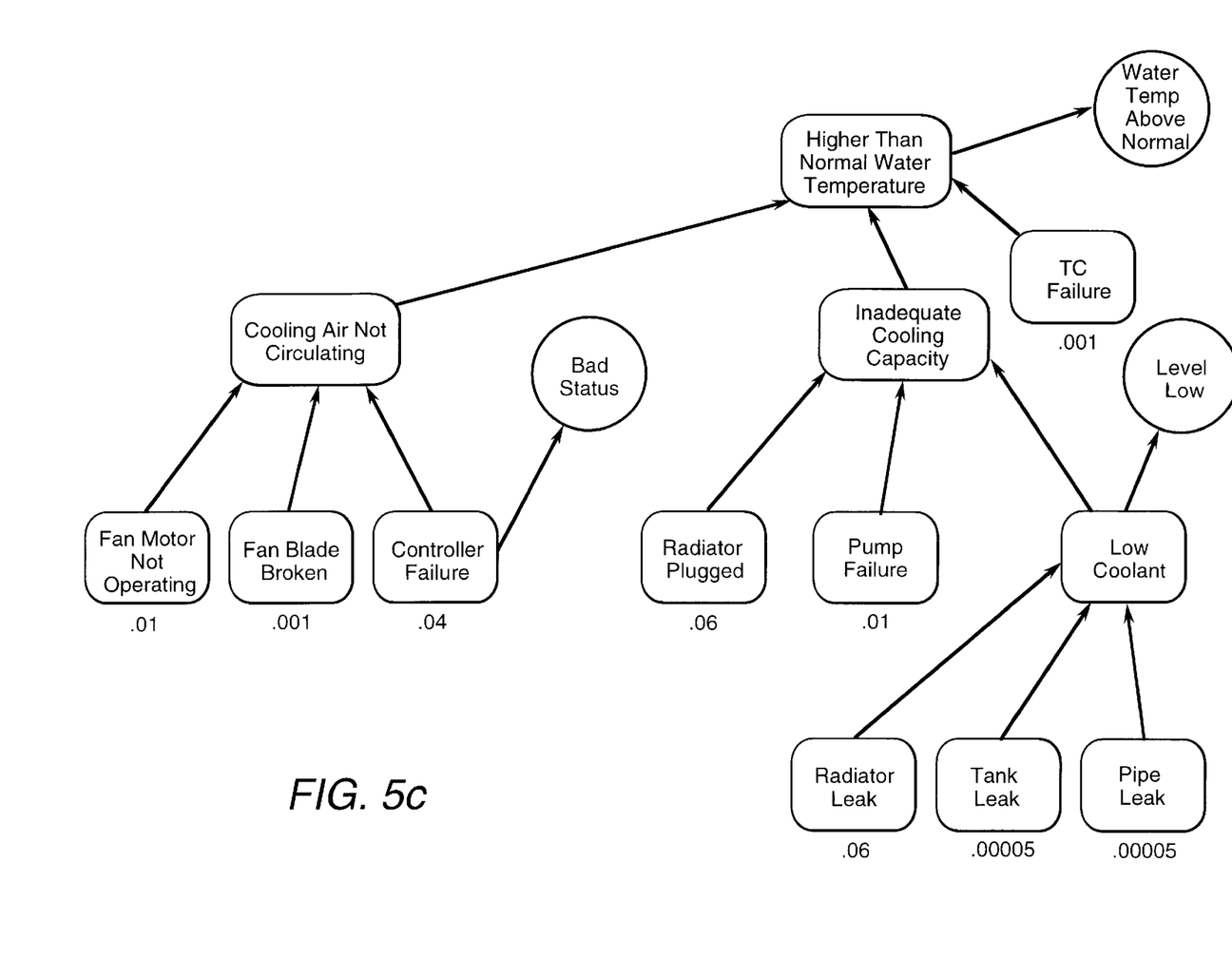

For each cause in the causal network, a prior probability indicating the likelihood of a failure is assigned. The prior probabilities are factors assigned to each cause that indicates the probability that the cause is present, in the absence of any additional knowledge from either the plurality of manual indicators or the incident log. FIG. 5c shows an example of probabilities assigned to each of the original cause conditions for the model engine cooling system. Note that in cases where a component has multiple failure modes, the probability of failure due to that failure mode is required. Also, note that the probability magnitudes of nodes grouped together dictate the likelihood that the particular failure mode is the problem. For example, in FIG. 5c, if there was no cooling air not circulating and there were no other problems present in the engine cooling system, then it would be predicted that a controller failure was four times more likely to occur than the fan motor not operating. A likelihood of a fan blade being broken would be an order of magnitude less likely. Another example is if there was no inadequate cooling capacity and there were no other problems present in the engine cooling system, then it would be predicted that a plugged radiator was six times more likely to occur than a pump failure. A likelihood of a low coolant failure would be an order of magnitude less likely.

Figure 5D:
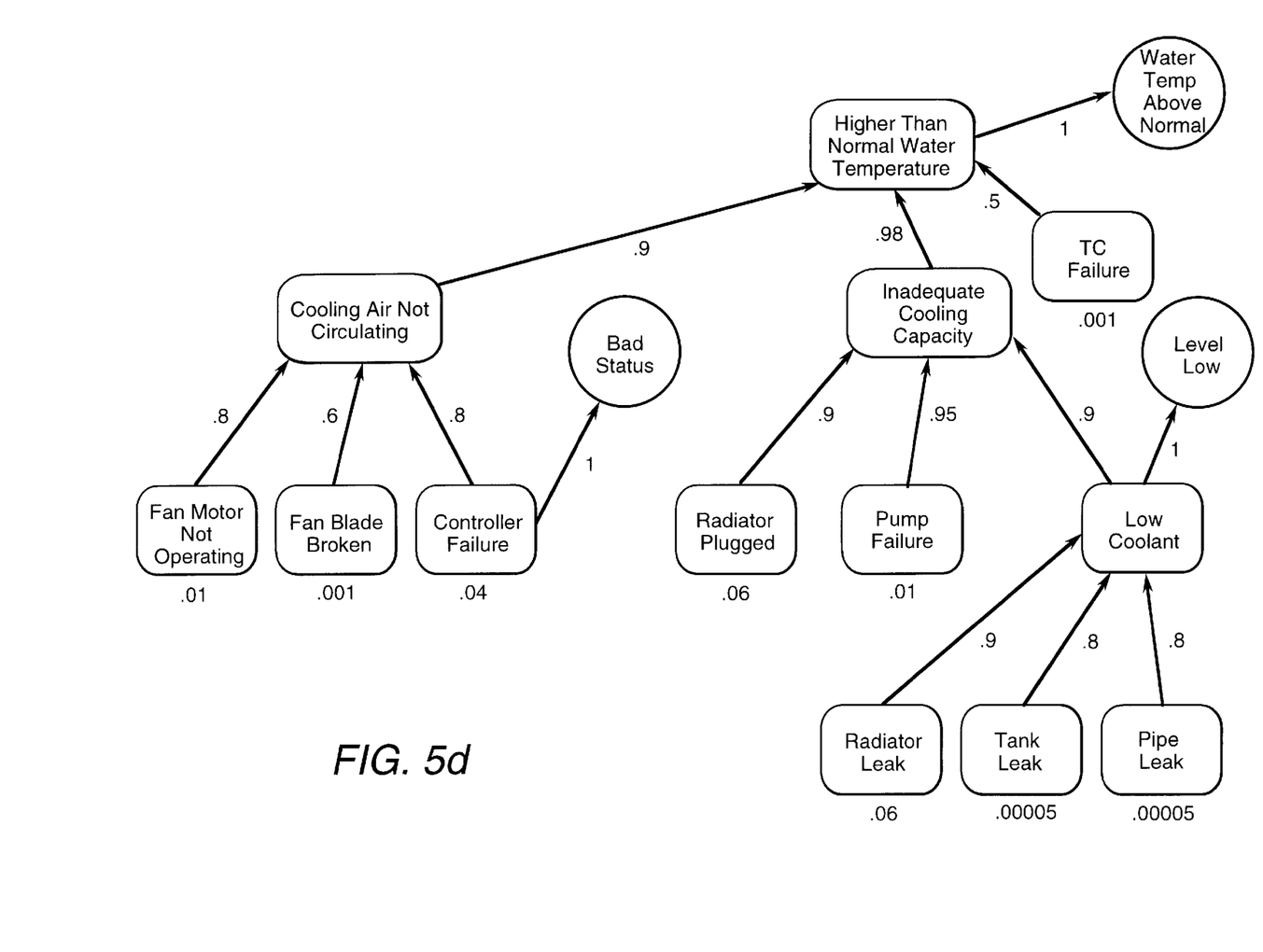

After a prior probability has been assigned to each of the root causes, then an edge probability estimating the strength of the relationship between the cause or failure mode and a next level effect is assigned for each relationship. In essence, the edge probabilities represent the probability that the effect will be true, given that the cause is already known to be true. If all of the causes are independent, and if all of the causes are false, then the effect is also false. In this embodiment, a single parameter between 0 and 1 is used to represent the strength of the relationship, however the use of other parameters is within the scope of the present invention. This is known as a "Noisy-Or" assumption. FIG. 5d shows an example of edge probabilities assigned to each of the relationships for the causal network developed for the model engine cooling system. From FIG. 5d, a thermocouple failure will result in an effect of a higher than normal water temperature fifty percent of the time; assuming it results in a lower temperature the rest of the time. Similarly, a pump failure almost always (95%) results in inadequate cooling capacity. Also, a radiator leak results in low coolant 90% of the time. Other examples of edge probabilities are apparent from FIG. 5d. Note that the aforementioned conditional probability information is derived from the edge probability information.

Causal networks for the other locomotive sub-systems are developed in the same manner used to develop a causal network for the model engine cooling system. In particular, the failure modes for each sub-system are identified, the cause and effect relationships for each of the failure modes are identified, prior probabilities indicating the likelihood of the failures are assigned, and an edge probability estimating the strength of the relationship between the failure mode and a next level effect node is assigned for each relationship. Once all of the causal networks have been developed, validated, and tested, then the networks are integrated into the diagnostic knowledge base 62 in the form of a belief network.

When the causal networks for all of the sub-systems has been completed and integrated, then it is used to diagnose incidents based on evidence that is submitted to the fault isolator 36 by the incident log 34. The incident information is then mapped to indicators in the fault isolator 36. The indicator evaluator 48 invokes the plurality of causal networks according to the mapped indicators and evaluates the mapped indicators with the probabilities in the invoked causal networks. The network solver 50 recalculates the probabilities of the invoked causal networks according to the status of the mapped indicators. In particular, the probabilities are recalculated using a known belief network solution algorithm. The diagnostic evaluator 52 then evaluates the recalculated probabilities in the invoked causal networks. In addition, the diagnostic evaluator provides to the diagnosis log 42 a list of the most likely causes for any locomotive failures, as well as provides a list of corrective actions to take to correct the failures. Furthermore, the diagnostic evaluator 52 prompts the operator to check a particular manual indicator 32 that may further refine the diagnosis. The indicator evaluator 48 invokes the plurality of causal networks according to the status of the manually examined indicator. The network solver 50 then recalculates the probabilities in the invoked causal networks according to the status of the manually examined indicator. The diagnostic evaluator 52 then evaluates the recalculated probabilities in the invoked causal networks and provides a new list of the most likely causes for any locomotive failures, as well as provides a list of corrective actions to take to correct the failures.

Figure 6A:
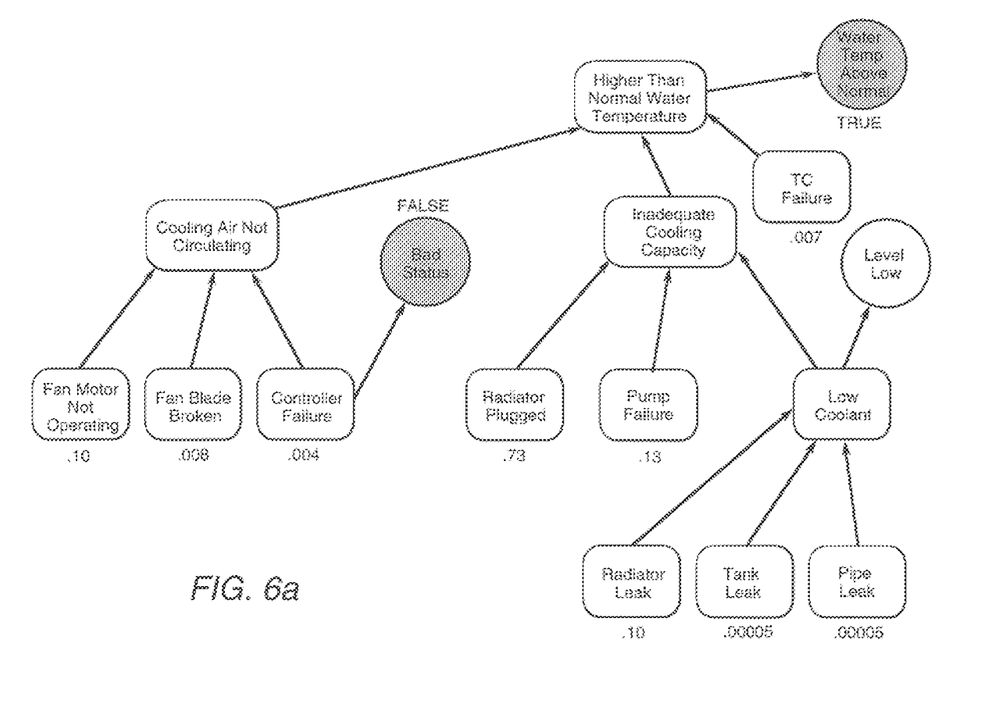
FIGS. 6a–6b show an example of how probabilities in a causal network are calculated based on initial evidence and how the probabilities are recalculated according to the presentation of additional evidence for the locomotive engine cooling sub-system, respectively.
Figure 6B:
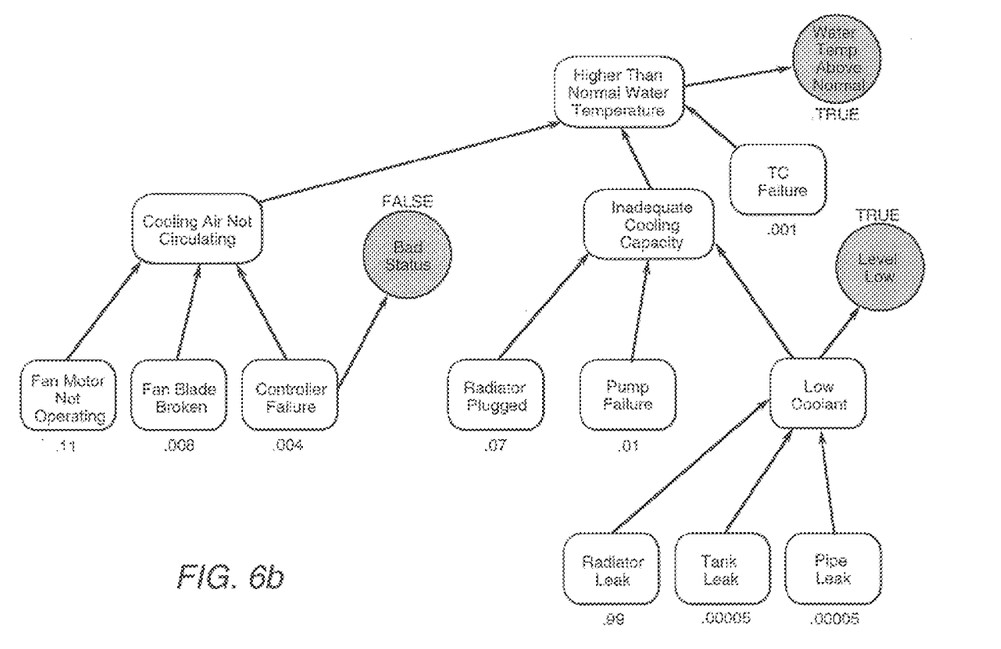

FIGS. 6a–6b show an example of how probabilities in a causal network are calculated based on initial evidence and how the probabilities are recalculated according to the presentation of additional evidence for the model locomotive engine cooling sub-system. In FIG. 6a, an indication that the water temperature is above-normal has been received in the locomotive incident log. Also, an indication has been received that the radiator fan controller is functioning properly, so the bad status indicator is false. At this time, the coolant level is unknown, so the level low indication is unknown. The network solver 50 then calculates the probabilities of the failure modes in the network according to the impact that the incidents have on the network. In this example, the probabilities for the failure modes show that a plugged radiator is the most likely cause (73%) of the fault based on the current information. A pump failure (13%), a fan motor failure (10%), and a radiator leak (10%) are also possible causes. The diagnostic evaluator 52 then evaluates the probabilities and provides a list of the possible failures in the above order. This diagnosis may be refined if the status of a manual indicator 32 would have a significant impact on the diagnosis. Only manual indicators that have the potential to significantly impact the diagnosis are requested to be checked. In the example in FIG. 6b, the operator is asked to check the status of the coolant level. In this example, the coolant level is observed to be low and this information is entered in the fault isolator 36 via the presentation manager 38 and the man-machine interface 40. The network solver 50 then recalculates the probabilities in the invoked causal network. The diagnostic evaluator 52 then evaluates the recalculated probabilities in the invoked causal network and provides a new list of the most likely causes for any locomotive failures, as well as provides a list of corrective actions to take to correct the failures. In this example, the additional information suggests that a radiator leak is strongly suspected (99%) as the cause of the fault. Other possibilities that are outputted to the diagnosis log 42 are that the fan motor is not operating (11%) or the radiator is plugged (7%). In addition, the diagnosis log provides a course of action to correct the list of these failures. The course of action is only generated for probabilities that meet a predetermined probability threshold. For example, if a probability threshold of 10% were used, then the instructions for the course of action would be "Inspect the radiator for leaks and replace, if necessary" and "Check the cooling fan motor for correct operation. Replace if necessary." Instructions related to the plugged radiator and other causes would not be issued because the failure probability of these causes did not exceed the predetermined probability threshold.

Using the fault isolator 36 enables a user to correct problems faster than the currently used approaches because the failures are isolated to the most probable set of causes. In addition, the fault isolator 36 can be used to find developing problems prior to becoming a significant problem by monitoring parameters which may indicate impending failure and processing the parameter data to identify developing problems.

Although the illustrative embodiment of the present invention has been described as the isolation of failures in locomotive sub-systems, the scope of the invention is not limited to this embodiment. In particular, the present invention can be used in various settings to diagnose causes of failures for complex equipment and processes. In this embodiment, a plurality of sensors are used without the incident log. The plurality of sensors are located about the process and measure physical phenomena associated with the equipment. A mapping means maps some of the sensor measurements to indicators. Each indicator is representative of an observable symptom detected in the equipment. A fault isolator coupled to the mapping means, determines causes for any failures associated with the equipment.

Figure 7:
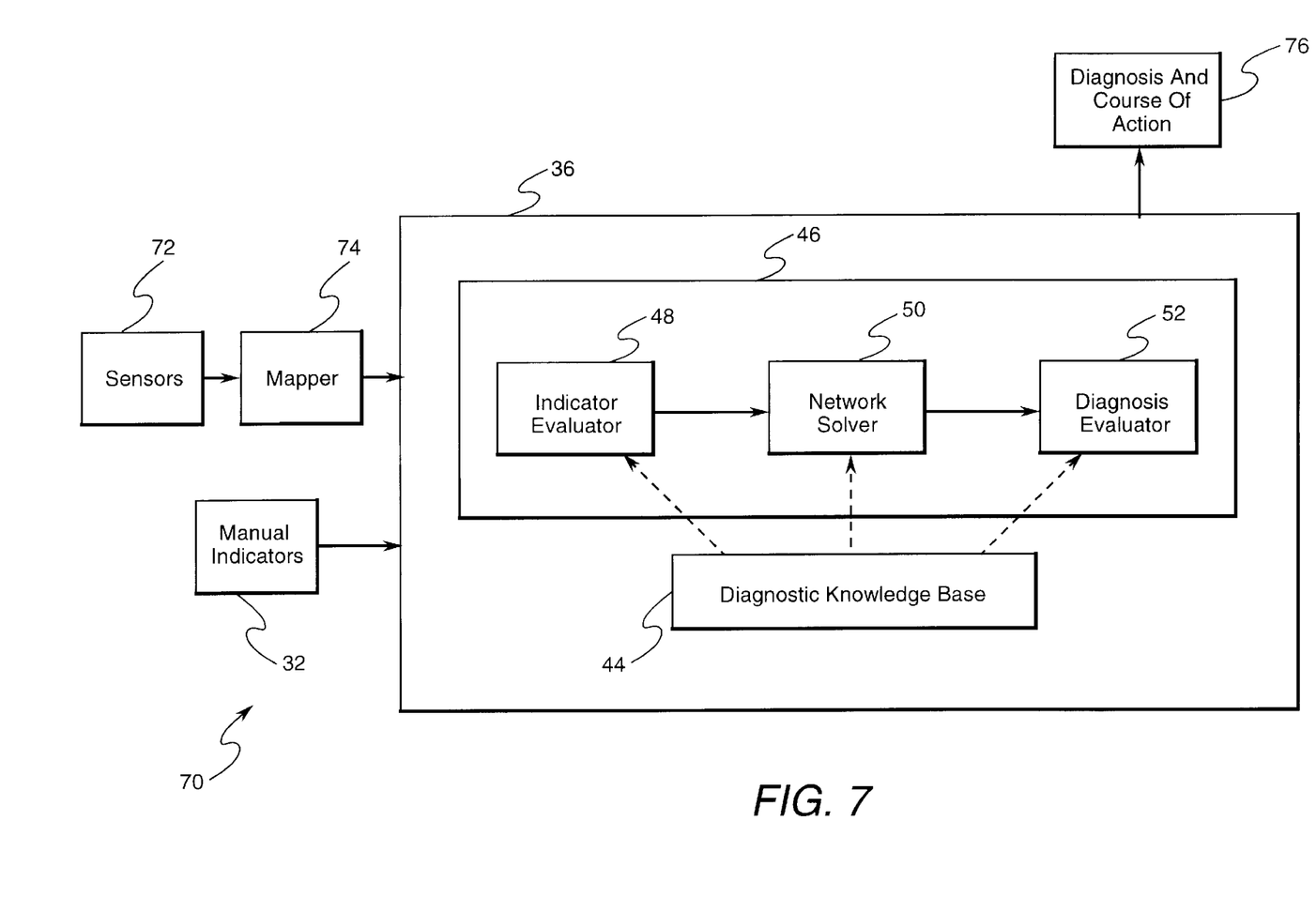
FIG. 7 is a block diagram of a system for isolating failures according to a second embodiment of the present invention.

FIG. 7 is a block diagram of a system 70 for isolating failures in a process having a plurality of equipment. The system 70 comprises a plurality of sensors 72 located about the process. The sensors measure physical phenomena associated with the equipment. A mapper 74 maps some of the measurements to indicators. Each indicator is representative of an observable symptom detected in a piece of equipment. The mapper 74 is coupled to the fault isolator 36, which determines causes for any failures associated with the equipment. As above, the fault isolator uses the diagnostic knowledge base 44 to store diagnostic information about failures occurring in each of the plurality of equipment and the indicators. The diagnostic information comprises a plurality of causal networks each having nodes for each of the plurality of equipment. Each causal network has a cause and effect relationship between some of the nodes, wherein some of the nodes represent root causes associated with failures in each of the equipment and some of nodes represent observable manifestations of the failures. The fault isolator 36 also uses the diagnostic engine 46 to process the mapped indicators with the diagnostic information in the diagnostic knowledge base 44. After the causes for any failures have been determined, the fault isolator provides a course of action to be performed for correcting the failures to the diagnosis means 76.

As in the first embodiment, each of the root causes in the causal networks has a prior probability indicating the likelihood of a failure in the absence of any additional knowledge provided from the sensors. In addition, each of the nodes in the causal networks has conditional probability information representing the strength of the relationships of the nodes to its causes. Again, the diagnostic engine 46 uses the indicator evaluator 48 to invoke the plurality of causal networks according to the mapped indicators and evaluate the mapped indicators with the probabilities in the causal networks. The network solver 50 recalculates the probabilities of the invoked causal networks according to the status of the mapped indicators. The diagnostic evaluator 52 evaluates the recalculated probabilities in the invoked causal networks and provides a list of the most likely causes for any failures, as well as provides a list of corrective actions to take to correct the failures. The diagnostic evaluator 52 then prompts an operator to check manual indicators 32 located about the equipment, that may have a further impact on the diagnosis of the process. The indicator evaluator invokes the plurality of causal networks according to the status of the manually examined indicator. The network solver 50 will then recalculate the probabilities in the invoked causal networks according to the status of the manually examined indicator. The diagnostic evaluator 52 then evaluates the recalculated probabilities in the invoked causal network and provides a new list of the most likely causes for any failures, as well as provides a list of corrective actions to take to correct the failures. After the causes for any failures have been determined, the fault isolator provides the course of action to be performed for correcting the failures to the diagnosis means 76.

It is therefore apparent that there has been provided in accordance with the present invention, a system and method for isolating failures in a locomotive having a plurality of sub-systems and a system and method for automatically isolating and correcting failures occurring in a process having a plurality of equipment that fully satisfy the aims and advantages and objectives hereinbefore set forth. The invention has been described with reference to several embodiments, however, it will be appreciated that variations and modifications can be effected by a person of ordinary skill in the art without departing from the scope of the invention. For example, it is possible to have the fault isolator located in a remote location and have the incident information and manual indicator information transmitted to the fault isolator. After determining the causes for the failures, the fault isolator can then transmit the causes and courses of action back to the operator.

We claim:

1. A system for isolating failures in a locomotive having a plurality of sub-systems, comprising:

means for supplying information on incidents occurring in each of the plurality of sub-systems during operation of the locomotive;

means for mapping some of the incidents to indicators, each indicator representative of an observable symptom detected in a sub-system;

a fault isolator coupled to the mapping means for determining causes for any failures associated with the incidents, the fault isolator comprising a diagnostic knowledge base having diagnostic information about failures occurring in each of the plurality of sub-systems and the indicators, wherein the diagnostic information comprises a plurality of causal networks, each causal network having a plurality of nodes for each of the plurality of sub-systems, each causal network having a cause and effect relationship between some of the plurality of nodes, wherein some of the nodes represent root causes associated with failures in each of the plurality of sub-systems and some of the nodes represent observable manifestations of the failures and a diagnostic engine for processing the mapped indicators with the diagnostic information in the diagnostic knowledge base, wherein the diagnostic engine comprises an indicator evaluator for invoking the plurality of causal networks according to the mapped indicators and evaluating the mapped indicators with the probabilities in the invoked causal networks and a network solver for recalculating the probabilities of the invoked causal networks according to the status of the mapped indicators; and means for providing a course of action to be performed for correcting the failures.

2. The system according to claim 1, wherein each of the root cause nodes in the causal networks has a prior probability indicating the likelihood of a failure in the absence of any additional knowledge.

3. The system according to claim 2, wherein each of the nodes in the causal networks has conditional probability information representing the strength of the relationships of the node to its causes.

4. The system according to claim 3, wherein the diagnostic engine further comprises a diagnostic evaluator for evaluating the recalculated probabilities in the invoked causal networks and providing a list of the most likely causes for any failures.

5. The system according to claim 4, wherein the diagnostic evaluator prompts an operator to check a manually examined indicator that may have a further impact on the diagnosis of the locomotive.

6. The system according to claim 5, wherein the indicator evaluator invokes the plurality of causal networks according to the status of the manually examined indicator.

7. The system according to claim 6, wherein the network solver recalculates the probabilities in the invoked causal networks according to the status of the manually examined indicator.

8. The system according to claim 7, wherein the diagnostic evaluator evaluates the recalculated probabilities in the invoked causal networks and provides a list of the most likely causes for any failures.

9. A method for isolating failures in a locomotive having a plurality of sub-systems, comprising the steps of:
   recording incidents occurring in each of the plurality of sub-systems during operation of the locomotive;
   mapping some of the recorded incidents to indicators, each indicator representative of an observable symptom detected in each sub-system;
   determining causes for any failures associated with the incidents with a diagnostic knowledge base having diagnostic information about failures occurring in each of the plurality of sub-systems and the indicators, wherein the diagnostic information comprises a plurality of causal networks, each causal network having a plurality of nodes for each of the plurality of subsystems, each causal network having a cause and effect relationship between some of the plurality of nodes, wherein some of the nodes represent root causes associated with failures in each of the plurality of sub-systems and some of the nodes represent observable manifestations of the failures and a diagnostic engine for processing the mapped indicators with the diagnostic information in the diagnostic knowledge base;
   invoking the plurality of causal networks according to the mapped indicators and evaluating the mapped indicators with the probabilities in the invoked networks;
   recalculating the probabilities of the invoked causal networks according to the status of the mapped indicators; and
   providing a course of action to be performed for correcting the failures.

10. The method according to claim 9, wherein each of the root cause nodes in the causal networks has a prior probability indicating the likelihood of a failure in the absence of any additional knowledge.

11. The method according to claim 10, wherein each of the nodes in the causal networks has conditional probability information representing the strength of the relationships of the node to its causes.

12. The method according to claim 11, further comprising the steps of evaluating the recalculated probabilities in the invoked causal networks and providing a list of the most likely causes for any failures.

13. The method according to claim 12, further comprising the step of prompting an operator to check a manually examined indicator that may have a further impact on the diagnosis.

14. The method according to claim 13, further comprising the step of invoking the plurality of causal networks according to the status of the manually examined indicator.

15. The method according to claim 14, further comprising the step of recalculating the probabilities in the invoked causal networks according to the status of the manually examined indicator.

16. The method according to claim 15, further comprising the steps of evaluating the recalculated probabilities in the invoked causal networks and providing a list of the most likely causes for any failures.

17. A system for automatically isolating failures occurring in a process having a plurality of equipment, comprising:
   a plurality of sensors located about the process for measuring physical phenomena associated with the plurality of equipment;
   means for mapping some of the sensor measurements to indicators, each indicator representative of an observable symptom detected in a piece of equipment;
   a fault isolator coupled to the mapping means for determining causes for any failures associated with the equipment, the fault isolator comprising a diagnostic knowledge base having diagnostic information about failures occurring in each of the plurality of equipment and the indicators, the diagnostic information comprising a plurality of causal networks each having a plurality of nodes for each of the plurality of equipment, each causal network having a cause and effect relationship between some of the plurality of nodes, wherein some of the nodes represent root causes associated with failures in each of the plurality of equipment and some of the nodes represent observable manifestations of the failures, and a diagnostic engine for processing the mapped indicators with the diagnostic information in the diagnostic knowledge base, wherein the diagnostic engine comprises an indicator evaluator for invoking the plurality of causal networks according to the mapped indicators and evaluating the mapped indicators with the probabilities in the invoked causal networks and a diagnostic evaluator for evaluating the recalculated probabilities in the invoked causal networks and providing a list of the most likely causes for any equipment failures; and
   means for providing a course of action to be performed for correcting the failures.

18. The system according to claim 17, wherein each of the root causes in the causal networks has a prior probability indicating the likelihood of a failure in the absence of any additional knowledge.

19. The system according to claim 18, wherein each of the nodes in the causal networks has conditional probability representing the strength of the relationships of the node to its causes.

20. The system according to claim 19, wherein the diagnostic engine further comprises a diagnostic evaluator for evaluating the recalculated probabilities in the invoked causal networks and providing a list of the most likely causes for any equipment failures.

21. The system according to claim 20, wherein the diagnostic evaluator prompts an operator to check a manually examined indicator that may have a further impact on the diagnosis of the process.

22. The system according to claim 21, wherein the indicator evaluator invokes the plurality of causal networks according to the status of the manually examined indicator.

23. The system according to claim 22, wherein the network solver recalculates the probabilities in the invoked causal networks according to the status of the manually examined indicator.

24. The system according to claim 23, wherein the diagnostic evaluator evaluates the recalculated probabilities in the invoked causal networks and provides a list of the most likely causes for any equipment failures.

25. A method for isolating failures occurring in a process having a plurality of equipment, comprising the steps of:

providing a plurality of causal networks each having a plurality of nodes for each of the plurality of equipment, each causal network having a cause and effect relationship between some of the plurality of nodes, wherein some of the nodes represent root causes associated with failures in each of the plurality of equipment and some of the nodes represent observable manifestations of the failures;

transforming the causal networks into a knowledge base having diagnostic information about failures occurring in each of the plurality of equipment and observable symptoms detected in each of the plurality of equipment;

coupling a diagnostic engine to the knowledge base;

measuring physical phenomena associated with the equipment;

mapping some of the measurements to indicators, each indicator representative of an observable symptom detected in a piece of equipment;

using the diagnostic information and the diagnostic engine to determine causes for any failures associated with the mapped indicators;

invoking the plurality of causal networks according to the mapped indicators and evaluating the mapped indicators with the probabilities in the invoked causal networks;

recalculating the probabilities of the invoked causal networks according to the status of the mapped indicators; and providing a course of action to be performed for correcting the failures.

26. The method according to claim 25, wherein each of the root cause nodes in the causal networks has a prior probability indicating the likelihood of a failure in the absence of any additional knowledge.

27. The method according to claim 26, wherein each of the nodes in the causal networks has conditional probability information representing the strength of the relationships of the node to its causes.

28. The method according to claim 27, further comprising the steps of evaluating the recalculated probabilities in the invoked causal networks and providing a list of the most likely causes for any equipment failures.

29. The method according to claim 28, further comprising the step of prompting an operator to check a manually examined indicator that may have a further impact on the diagnosis.

30. The method according to claim 29, further comprising the step of invoking the plurality of causal networks according to the status of the manually examined indicator.

31. The method according to claim 30, further comprising the step of recalculating the probabilities in the invoked causal networks according to the manually examined indicator.

32. The method according to claim 31, further comprising the steps of evaluating the recalculated probabilities in the invoked causal networks and providing a list of the most likely causes for any equipment failures.

* * * * *